United States Patent
Larson et al.

(10) Patent No.: US 7,509,549 B2
(45) Date of Patent: Mar. 24, 2009

(54) DYNAMIC FREQUENCY SCALING FOR JTAG COMMUNICATION

(75) Inventors: Lee Larson, Katy, TX (US); Gilbert Laurenti, Saint Paul (FR)

(73) Assignee: Texas Instruments Incorporated, Dallas, TX (US)

( * ) Notice: Subject to any disclaimer, the term of this patent is extended or adjusted under 35 U.S.C. 154(b) by 217 days.

(21) Appl. No.: 11/616,673

(22) Filed: Dec. 27, 2006

(65) Prior Publication Data

US 2008/0163017 A1    Jul. 3, 2008

(51) Int. Cl.
*G01R 31/28* (2006.01)
(52) U.S. Cl. .................... 714/726; 714/724
(58) Field of Classification Search ................ 714/726, 714/724, 38, 39, 701, 47, 48, 733, 734, 30
See application file for complete search history.

(56) References Cited

U.S. PATENT DOCUMENTS

| 5,072,418 | A | * | 12/1991 | Boutaud et al. | 708/207 |
| 5,329,471 | A | * | 7/1994 | Swoboda et al. | 703/23 |
| 6,925,634 | B2 | * | 8/2005 | Hunter et al. | 717/124 |
| 6,990,657 | B2 | * | 1/2006 | Hunter et al. | 717/129 |
| 7,007,267 | B2 | * | 2/2006 | Hunter et al. | 717/124 |

* cited by examiner

*Primary Examiner*—Phung M Chung
(74) *Attorney, Agent, or Firm*—Ronald O. Neerings; Wade James Brady, III; Frederick J. Telecky, Jr.

(57) ABSTRACT

A system comprising a system under test (SUT) having a control logic. The SUT further comprises testing logic coupled to the SUT and adapted to provide to the SUT a clock signal to facilitate communications between the testing logic and the SUT. The control logic monitors a number of activated processors in a scan chain coupled to the control logic. If the number of activated processors is reduced, the control logic dynamically decreases a frequency of the clock signal.

20 Claims, 2 Drawing Sheets

DYNAMIC FREQUENCY SCALING FOR JTAG COMMUNICATION

BACKGROUND

Software is tested during the software development process to identify and remove errors. Although various software testing techniques are available, in many cases, software may be tested by loading the software onto the memory of an electronic device (also known as a "system under test," or SUT) and the SUT may be coupled to a testing computer via a test interface (e.g., Joint Test Action Group (JTAG) interface). The testing computer thus is enabled to test the software stored on the SUT by transmitting signals to and receiving signals from the SUT.

In many cases, the testing computer provides a clock signal to the SUT in order to facilitate communications therebetween. To maximize performance, the frequency associated with the clock signal generally is set at the highest possible value that can be sustained by the testing computer/SUT system. However, in some cases, the SUT may enter a power-saving mode in which the voltage usage of the SUT is reduced to a level that is incompatible with the clock signal frequency. As a result of this incompatibility, communications between the SUT and the testing computer may be negatively impacted. A solution is desirable.

SUMMARY

Accordingly, there are disclosed herein a technique by which communications between a testing computer and a SUT are protected from fluctuations in the voltage levels of the SUT. An illustrative embodiment includes a system comprising a system under test (SUT) having a control logic. The SUT further comprises testing logic coupled to the SUT and adapted to provide to the SUT a clock signal to facilitate communications between the testing logic and the SUT. The control logic monitors a number of processors in a scan chain coupled to the control logic. If the number of processors is reduced, the control logic decreases a frequency of the clock signal.

Another illustrative embodiment comprises a device including a storage having software code. The device further includes a control logic adapted to receive a clock signal from a testing logic external to the device, the clock signal usable to facilitate the transmission of test signals between the control logic and the testing logic, the test signals usable to debug the software code. If the control logic determines that a number of processors in a scan chain of the device has been reduced, the control logic decreases a frequency of the clock signal.

Yet another illustrative embodiment comprises a method including transferring a communication clock signal from a testing logic to a system under test (SUT) to facilitate communications between the testing logic and the SUT. The communications include test signals used to debug software stored on the SUT. The method also comprises monitoring the number of processors in a scan chain of the SUT and adjusting a frequency of the communication clock signal in accordance with the number of processors.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
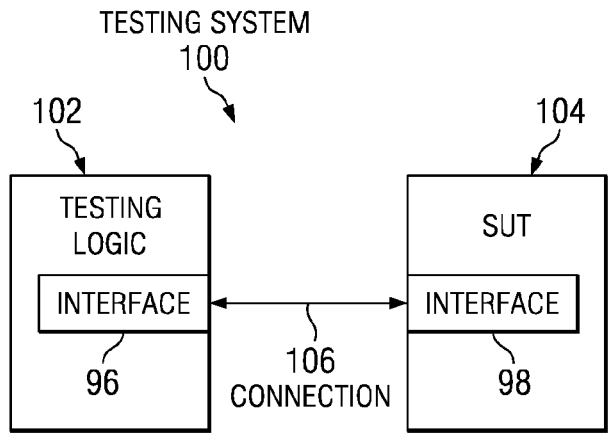
FIG. 1 shows a block diagram of a testing logic coupled to a test system, in accordance with embodiments of the invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A system under test (SUT) may comprise software that is to be tested. One or more processors may be included as part of the SUT. At least some of the processors may be coupled together to form a "scan chain." Processors may be dynamically added to or removed from a scan chain. A processor may be added to a scan chain by "activating," "selecting" or "adding" the processor to be part of the scan chain. A processor may be removed from a scan chain by "deactivating," "deselecting" or "removing" the processor. Activating, selecting, deactivating, deselecting, adding and/or removing a processor may include any suitable type of selection process, such as the throttling up or down the processor, powering on or shutting off the processor, bringing the processor to a "sleep" mode or a low-power mode, etc. Preferably, the act of "deselecting," "deactivating" or "removing" a processor is such that if the same act was applied to all processors in the SUT, the SUT could operate at a lower voltage level (e.g., a "sleep mode"). Preferably, the act of "selecting," "activating" or "adding" a processor is such that, regardless of the statuses of other processors in the SUT, the SUT could not operate in a "sleep mode." Further, because processors use test access ports (TAPs) as interfaces when coupling to a scan chain, processors may be referred to herein as "TAPs." The terminology described above is not limited to processors and may be applied to any suitable circuit logic. Further still, processors (or "TAPs") that are activated, selected, added, etc. are considered to be "present" in a scan chain. Processors (or "TAPs") that are deactivated, deselected, removed, etc. are considered to be "absent" from the scan chain.

Disclosed herein are embodiments of a technique by which a testing system (e.g., a Joint Test Action Group (JTAG) testing system, although the scope of disclosure is not limited as such) dynamically scales a communications clock frequency (e.g., JTAG clock frequency) in accordance with the presence or absence of processors in a scan chain. By scaling the JTAG clock frequency in this way, the integrity of communications between a test system and a system under test (SUT) is preserved despite voltage level fluctuations of the SUT.

For example, a SUT may contain logic that is partitioned into multiple voltage domains. The SUT may have multiple processors, with some processors in some voltage domains and other processors in other voltage domains. Thus, the number of processors that are active and being tested in the SUT varies, since voltage domains containing processor(s) are routinely activated and deactivated (e.g., processors not being used may be deactivated to save power). In some cases, all processors (i.e., all voltage domains comprising one or more processors) may be taken offline. In such cases, the SUT may enter a "sleep mode" in which the power consumption of the SUT is minimized. While in the sleep mode, the SUT may be unable to support communications at the original JTAG clock frequency. Accordingly, the techniques described herein are used to dynamically adjust the JTAG clock frequency (e.g., using a clock divider) in accordance with the presence or absence of active processors in the SUT at any given time. By adjusting the JTAG clock frequency in this way, communication integrity between the test system and the SUT is preserved, despite voltage fluctuations that may occur in the SUT (e.g., by activating and deactivating voltage domains). The techniques also may be applied to situations in which voltage fluctuations occur in the SUT for other reasons.

A SUT preferably comprises control logic which facilitates communication between processors in the SUT. Each processor in a scan chain preferably couples to this control logic by way of a test access port (TAP). Although the scope of disclosure is not limited to any specific kind of TAP, in at least some embodiments, a TAP comprises a port having four pins that facilitate the transfer of instructions and data between a processor and a SUT control logic coupled to that processor. The four pins may include a clock signal pin, a data input pin, a data output pin and a "mode" pin which may specify a test mode or state that the control logic is to enter. The control logic is considered to be a "primary" TAP in the scan chain, and active processors in the scan chain may be referred to as "secondary" TAPs. A processor that is coupled to the control logic but which is inactive generally is not considered to be a TAP in the scan chain. The control logic preferably adjusts the JTAG communication clock frequency based on the number of TAPs in the scan chain of the SUT. More specifically, if all secondary TAPs in the scan chain are taken offline and only the primary TAP remains, the control logic decreases the JTAG communication clock frequency accordingly. Likewise, if secondary TAPs are added to a scan chain previously having only the primary TAP, the control logic increases the JTAG communication clock frequency accordingly.

FIG. 1 shows a block diagram of a testing system 100 in accordance with various embodiments. The testing system 100 comprises a testing logic 102 (e.g., an emulator) coupled to a SUT 104 via a connection 106. The connection 106 couples to the testing logic 102 by way of an interface 96, and the connection 106 couples to the SUT 104 by way of an interface (e.g., JTAG port) 98. The testing logic 102 comprises various hardware and software components which are used to debug and to verify proper functionality of hardware and/or software components in the SUT 104. Using the connection 106, the SUT 104 transfers test signals to, and receives result signals from, the testing logic 102. The testing logic 102 uses the result signals to, for example, debug software stored on the SUT 104.

Figure 2:
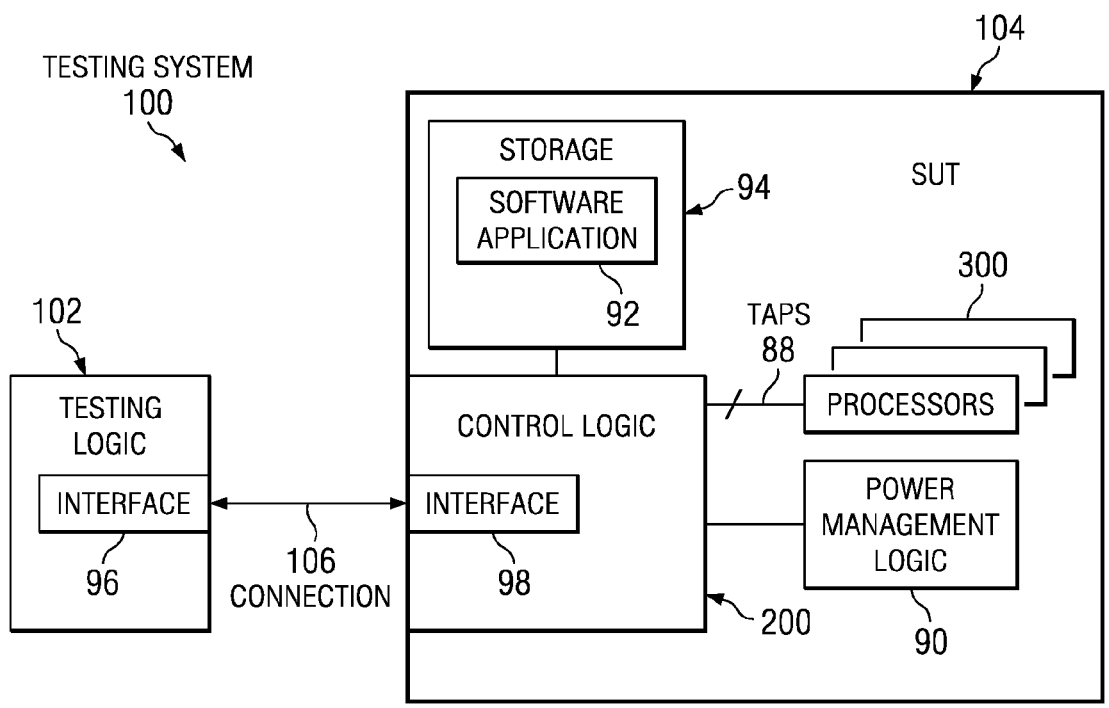
FIG. 2 shows the block diagram of FIG. 1 with the test system including a control logic and at least one processor coupled to the control logic, in accordance with embodiments of the invention.

FIG. 2 shows a detailed version of the block diagram of the testing system 100. The SUT 104 comprises a control logic 200 (e.g., an ICEPick® designed by TEXAS INSTRUMENTS®) coupled to at least one processor 300 (via at least one TAP connection 88) and comprising the interface 98. The processor(s) 300 and the control logic 200 together comprise a scan chain. As previously explained, the control logic 200 is associated with the primary TAP and any active processor(s) 300 are associated with secondary TAPs. The SUT 104 also comprises a storage 94 comprising a software application 92 that is debugged using the testing logic 102. When executed, the software application 92 causes a processor 300 to program the power management logic 90, which controls the voltage provided to each of the components (or voltage domains) of the SUT 104. In at least some embodiments, the interface 98 and the processor(s) 300 are associated with a common voltage domain.

The control logic 200 receives signals from the interface 98, manipulates the signals as described below and provides the manipulated signals to the processor(s) 300 and/or other logic in the SUT 104. Likewise, the control logic 200 receives signals from the processor(s) 300 (and/or other logic in the SUT 104), manipulates the signals as described below and provides the manipulated signals to the interface 98. In particular, the control logic 200 may receive a communications clock signal (e.g., a JTAG clock signal) from the testing logic 102 via the interface 98. The control logic 200 dynamically adjusts the frequency of the clock signal in accordance with the presence or absence of secondary TAPs in the scan chain. Preferably, if the number of TAPs decreases from multiple TAPs to a single (primary) TAP, the control logic 200 scales down the JTAG clock frequency accordingly. Likewise, if the number of TAPs increases from a single, primary TAP to multiple TAPs, the control logic 200 preferably increases the JTAG clock frequency accordingly. If a change in the number of TAPs does not result in the presence of secondary TAPs where previously there were none, or if the change in the number of TAPs does not result in the absence of secondary TAPs where previously there was at least one, the JTAG clock signal frequency preferably is not adjusted.

The control logic 200 preferably monitors the number of TAPs coupled to the control logic 200 (e.g., continuously or at regular intervals) using any suitable technique. In some embodiments, a polling/voting technique may be used, whereby the control logic 200 broadcasts a poll signal and each processor that receives a copy of the poll signal transfers a response signal to the control logic 200. In turn, the control logic 200 determines the number of response signals received, thereby determining the number of processor TAPs coupled to the control logic 200. Such examples of how the number of processor TAPs coupled to the control logic 200 may be determined comprise illustrative embodiments. The scope of disclosure is not limited to these illustrative embodiments.

Figure 3:
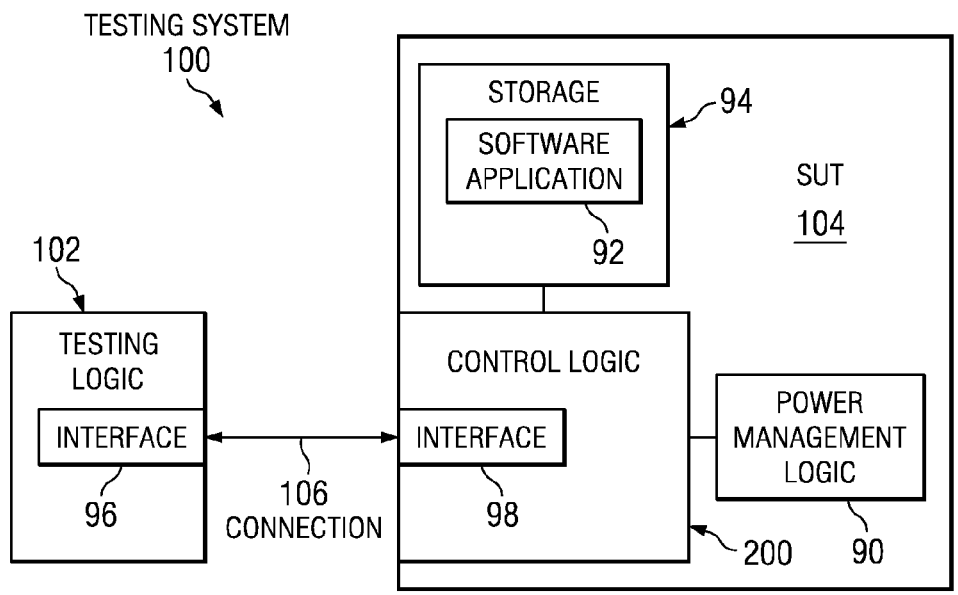
FIG. 3 shows the block diagram of FIG. 1 with the test system including a control logic and no processors, in accordance with embodiments of the invention.

For example, in the testing system 100 of FIG. 2, the control logic 200 uses a JTAG clock signal received from the testing logic 102 via the connection 106. As previously described, the JTAG clock signal is a reference clock for JTAG communications between the testing logic 102 and the SUT 104. The control logic 200, using any suitable technique, determines that multiple processors 300 are coupled to the control logic 200 via multiple TAPs. Accordingly, the frequency of the JTAG clock signal is set in accordance with the fact that there are multiple processor TAPs coupled to the control logic 200. However, processor TAPs may be dynamically coupled to or uncoupled from the control logic 200 as desired. For example, although FIG. 2 shows multiple processors 300 coupled to the control logic 200 via multiple TAPs, the processors 300 may be dynamically removed from the control logic 200, resulting in the configuration of FIG. 3. The control logic 200 preferably monitors (e.g., using a polling technique) the number of processors coupled to the control logic 200 so that, if one or more processors is dynamically coupled to or uncoupled from the control logic 200, the control logic 200 detects the change and modifies the JTAG clock signal frequency accordingly. In some embodiments, when the number of TAPs in the scan chain is reduced to the single, primary TAP (e.g., as in the transition from FIG. 2 to FIG. 3), the control logic 200 decreases the JTAG clock frequency to a predetermined frequency preprogrammed into the control logic 200. Likewise, in some embodiments, when the number of TAPs in the scan chain is increased from a single, primary TAP to multiple TAPs (e.g., as in the transition from FIG. 3 to FIG. 2), the control logic 200 preferably increases the JTAG clock frequency to the maximum possible frequency sustainable on the system 100.

Figure 4:
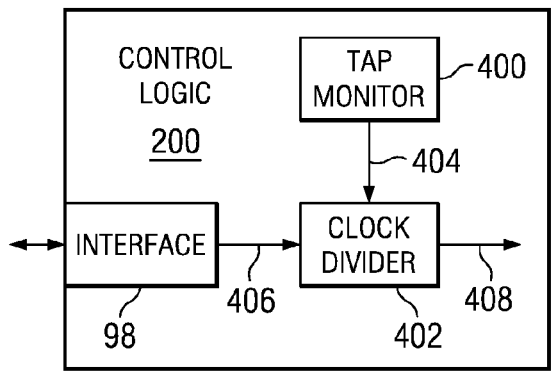
FIG. 4 shows a detailed view of the control logic of FIGS. 2 and 3, in accordance with embodiments of the invention.

FIG. 4 shows a detailed, illustrative block diagram of the control logic 200. The control logic 200 comprises the interface 98, a TAP monitor 400 and a clock divider 402. The TAP monitor 400 comprises logic which monitors the number of active processors (i.e., secondary TAPs) coupled to the control logic 200 in the form of a scan chain. The TAP monitor 400 may monitor for TAPs using any technique described above or any other suitable monitoring technique. The TAP monitor 400 provides the TAP information to the clock divider 402 via connection 404. The clock divider 402 receives the JTAG clock signal from the testing logic 102 via connection 406 and adjusts the clock signal as described above.

More specifically, the clock divider 402 adjusts the clock signal in accordance with the TAP information received from the TAP monitor 400. If a scan chain which had one or more secondary TAPs no longer has any secondary TAPs, the TAP monitor 400 causes the clock divider 402 to reduce the JTAG clock signal frequency and to output the reduced-frequency clock signal on output connection 408. In some embodiments, if a scan chain which did not have a secondary TAP now has a secondary TAP, the TAP monitor 400 causes the clock divider 402 to stop dividing the incoming JTAG clock signal frequency, thereby increasing the clock signal frequency that is output on connection 406. In this way, the control logic 200 adjusts the frequency of the JTAG communications clock signal in accordance with the presence or absence of secondary TAPs in a scan chain of the SUT 104. The output connection 406 (i.e., the adjusted JTAG communication clock signal) is provided to other logic (not specifically shown) in the SUT 104 to facilitate JTAG communication with the testing logic 102. Further information on JTAG communication clocks may be found in commonly-owned, co-pending U.S. patent. application Ser. No. 20,060,248,395, incorporated herein by reference.

The decrease or increase in clock signal frequency is determined by the TAP monitor 400. In some embodiments, the TAP monitor 400 provides to the clock divider 402 a signal comprising an integer. The clock divider 402 divides the clock signal frequency by the integer and outputs the resulting signal on connection 408. The TAP monitor 400 may dynamically determine the integer value or the TAP monitor 400 may be preprogrammed with integer values. The TAP monitor 400 and clock divider 402 logic constitute an illustrative embodiment that may be used to adjust the JTAG clock frequency in accordance with the presence or absence of processors in a scan chain associated with the control logic 200. The scope of disclosure is not limited to the logic or technique of FIG. 4. Other logic and techniques also may be used.

In at least some embodiments, the clock divider logic 402 itself operates using the initial JTAG clock frequency; the output of the logic 402 is the modified frequency that is distributed to other portions of the SUT 104. Even though the overall operating voltage level of the SUT 104 is reduced (e.g., because the SUT 104 is in sleep mode), the clock divider logic 402 preferably comprises one or more registers which are high performance cells and which operate at a higher frequency (i.e., the original JTAG clock frequency) than the rest of the SUT 104. In this way, the clock divider logic 402, despite being provided with a lower operating voltage, is able to receive the high frequency JTAG clock signal and is able to translate the clock signal to a lower frequency usable by other portions of the SUT 104.

Figure 5:
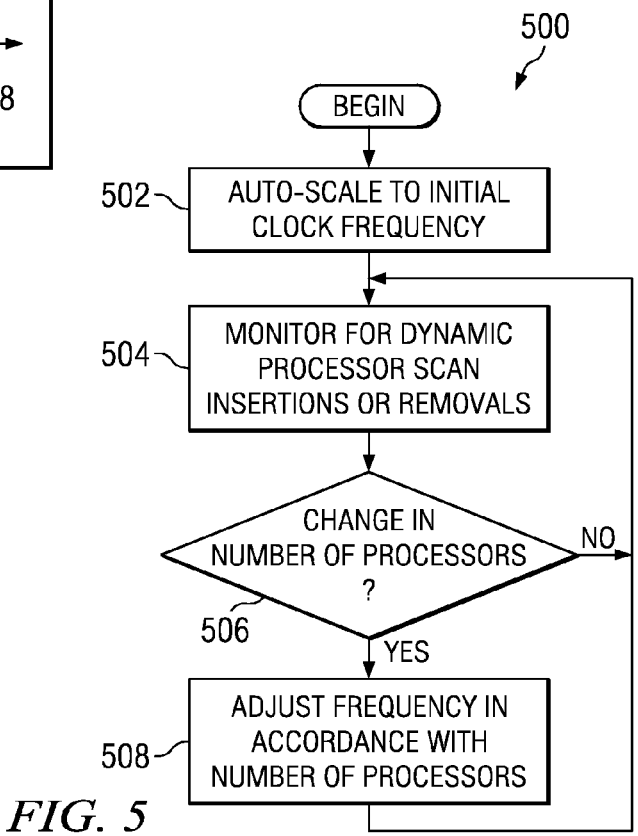
FIG. 5 shows a flow diagram of a method, in accordance with embodiments of the invention.

FIG. 5 shows a flowchart of an illustrative method 500 in accordance with embodiments of the invention. The method 500 comprises auto-scaling the JTAG communications clock to an initial frequency upon system start-up (block 502). The method 500 further comprises monitoring the SUT 104 for dynamic processor scan insertions or removals (block 504). If there has been a change in the number of active processors (i.e., secondary TAPs) coupled to the control logic 200 (block 506), the method 500 comprises adjusting the JTAG clock frequency in accordance with the total number of active processors coupled to the control logic 200 (block 508). In at least some embodiments, if the change in the number of active processors is such that there are no longer any secondary TAPs in the scan chain, then the JTAG clock frequency may be reduced, e.g., as described above. Likewise, if the change in the number of active processors is such that there are now one or more secondary TAPs in the scan chain where previously there were none, then the JTAG clock frequency may be increased, e.g., as described above. As shown in FIG. 5, the monitoring in block 504 (and subsequent adjustment in block 508) is performed periodically over a length of time.

The above discussion is meant to be illustrative of the principles and various embodiments of the present invention. Numerous variations and modifications will become apparent to those skilled in the art once the above disclosure is fully appreciated. For example, although the JTAG clock signal frequency adjustments described above are performed on the SUT 104, in some embodiments, a similar adjustment may be made on the testing logic 102 in lieu of the SUT 104 (e.g., using a clock divider or some other suitable circuit logic). It is intended that the following claims be interpreted to embrace all such variations and modifications.

What is claimed is:

1. A system, comprising:
   a system under test (SUT) comprising a control logic; and
   testing logic coupled to said SUT and adapted to provide to the SUT a clock signal to facilitate communications between the testing logic and the SUT;
   wherein said control logic monitors a number of activated processors in a scan chain coupled to the control logic;
   wherein, if said number of activated processors is reduced, the control logic dynamically decreases a frequency of said clock signal.

2. The system of claim 1, wherein said clock signal comprises a Joint Test Action Group (JTAG) clock signal.

3. The system of claim 1, wherein the communications between the testing logic and the SUT are for debugging software stored on the SUT.

4. The system of claim 1, wherein the control logic monitors said number of activated processors in the scan chain by monitoring the number of test access ports (TAPs) associated with the scan chain.

5. The system of claim 1, wherein a primary test access port (TAP) is associated with the control logic and a secondary TAP is associated with a processor, and wherein, if said scan chain comprises only the primary TAP and no activated secondary TAPs, the control logic decreases said frequency of the clock signal.

6. The system of claim 5, wherein, if said scan chain comprises the primary TAP and a secondary TAP, the control logic increases said frequency of the clock signal.

7. The system of claim 1, wherein the control logic periodically monitors the number of activated processors and wherein the control logic adjusts the frequency of the clock signal multiple times in accordance with said monitoring.

8. A device, comprising:
   a storage comprising software code; and
   a control logic adapted to receive a clock signal from a testing logic external to said device, said clock signal usable to facilitate the transmission of test signals between the control logic and said testing logic, said test signals usable to debug the software code;
   wherein, if the control logic determines that a number of processors in a scan chain of the device has been reduced, the control logic dynamically decreases a frequency of said clock signal.

9. The device of claim 8, wherein said clock signal comprises a Joint Test Action Group (JTAG) clock signal.

10. The device of claim 8, wherein, if the control logic determines that a number of processor test access ports (TAPs) in the scan chain of the device has been reduced, the control logic decreases the frequency of said clock signal.

11. The device of claim 8, wherein a primary test access port (TAP) is associated with the control logic and a secondary TAP is associated with a processor, and wherein, if the scan chain comprises only the primary TAP and no secondary TAPs, the control logic decreases the frequency of the clock signal.

12. The device of claim 11, wherein, if said scan chain comprises the primary TAP and a secondary TAP, the control logic increases the frequency of the clock signal.

13. The device of claim 8, wherein the control logic comprises a first logic to monitor said number of processors and a clock divider, and wherein said clock divider adjusts said frequency of the clock signal using a signal provided by said first logic.

14. The device of claim 8, wherein the control logic decreases the frequency of the clock signal to a predetermined frequency preprogrammed into the device.

15. A method, comprising:
   transferring a communication clock signal from a testing logic to a system under test (SUT) to facilitate communications between said testing logic and the SUT, said communications including test signals used to debug software stored on the SUT;
   monitoring the number of activated processors in a scan chain of the SUT; and
   adjusting a frequency of the communication clock signal in accordance with said number of activated processors.

16. The method of claim 15, wherein transferring said communication clock signal comprises using a Joint Test Action Group (JTAG) clock signal.

17. The method of claim 15, wherein monitoring said number of activated processors in the scan chain comprises monitoring a number of processor test access ports (TAPs) in said scan chain.

18. The method of claim 15, wherein a primary test access port (TAP) is associated with a control logic of the SUT and a secondary TAP is associated with a processor of the SUT, and wherein, if said scan chain comprises the primary TAP but no activated secondary TAPs, the method comprises reducing said frequency of the communication clock signal.

19. The method of claim 18, wherein, if said scan chain comprises the primary TAP and a secondary TAP, the method comprises increasing said frequency of the communication clock signal.

20. The method of claim 15, wherein adjusting said frequency comprises adjusting the frequency before the communication clock signal is transferred from the testing logic to the SUT.

* * * * *